United States Patent [19]

Gozdz et al.

[11] Patent Number: 5,571,634
[45] Date of Patent: Nov. 5, 1996

[54] HYBRID LITHIUM-ION BATTERY POLYMER MATRIX COMPOSITIONS

[75] Inventors: Antoni S. Gozdz, Tinton Falls; Caroline N. Schmutz, Eatontown; Paul C. Warren, Far Hills, all of N.J.

[73] Assignee: Bell Communications Research, Inc., Morristown, N.J.

[21] Appl. No.: 510,984

[22] Filed: Aug. 3, 1995

Related U.S. Application Data

[63] Continuation-in-part of Ser. No. 160,018, Nov. 30, 1993, Pat. No. 5,460,904, which is a continuation-in-part of Ser. No. 110,262, Aug. 23, 1993, Pat. No. 5,418,091.

[51] Int. Cl.⁶ .......................... H01M 10/08; H01M 4/36
[52] U.S. Cl. .......................... 429/192; 429/218; 429/224
[58] Field of Search .................... 429/192, 224, 429/218

[56] References Cited

U.S. PATENT DOCUMENTS

| | | | |
|---|---|---|---|
| 4,952,466 | 8/1990 | Cipriano et al. | 429/192 X |
| 5,219,680 | 6/1993 | Fauteux | 429/192 |

*Primary Examiner*—John S. Maples
*Attorney, Agent, or Firm*—Leonard Charles Suchyta; Lionel N. White

[57] ABSTRACT

A hybrid polymeric matrix composition for a lithium-ion rechargeable battery comprises a copolymer of vinylidene fluoride with about 8 to 20% by weight chlorotrifluoroethylene.

13 Claims, 2 Drawing Sheets

HYBRID LITHIUM-ION BATTERY POLYMER MATRIX COMPOSITIONS

RELATED APPLICATIONS

This application is a continuation-in-part of U.S. patent application Ser. No. 08/160,018, filed 30 Nov. 1993, now U.S. Pat. No. 5,460,904 issued 24 Oct. 1995, which was a continuation-in-part of U.S. patent application Ser. No. 08/110,262, filed 23 Aug. 1993, now U.S. Pat. No. 5,418,091, issued 23 May 1995. The prior patents, which are assigned to the assignee of this application, are incorporated herein by reference in their entirety.

BACKGROUND OF THE INVENTION

The present invention relates to electrolytic cells comprising polymeric film composition electrodes and separator membranes and to a manner of using such cells to provide highly efficient and economical batteries. In particular, the invention relates to unitary rechargeable lithium battery cells comprising an intermediate separator element containing an electrolyte solution through which lithium ions from a source electrode material move between cell electrodes during the charge/discharge cycles of the cell.

The invention is particularly useful for making such cells in which the ion source electrode is a material, such as a transition metal oxide, capable of intercalating lithium ions, and where an electrode separator membrane comprises a polymeric matrix made ionically conductive by the incorporation of an organic solution of a dissociable lithium salt which provides ionic mobility. More specifically, the present invention relates to the use of a class of polymeric compounds, in particular poly(vinylidene fluoride-co-chlorotrifluoroethylene) copolymers, in preparing such separator membranes and associated polymeric matrix cell electrode compositions.

Rechargeable lithium-ion battery cells, such as described in the incorporated disclosures, have generally been constructed by means of the lamination of electrode and separator/electrolyte cell elements which are individually prepared, by coating, extrusion, or otherwise, from compositions comprising polymeric materials, e.g., a plasticized polyvinylidene fluoride (PVdF) copolymer with hexafluoropropylene. For example, in the construction of a lithium-ion battery, a current collector layer of aluminum foil or grid was overlaid with a positive electrode film or membrane separately prepared as a coated layer of a dispersion of lithium intercalated electrode composition, e.g., a $LiMn_2O_4$ powder in a copolymer matrix solution, which was dried to form the membrane. A separator/electrolyte membrane formed as a dried coating of a composition comprising a solution of the copolymer and a compatible plasticizer was then overlaid upon the positive electrode film. A negative electrode membrane formed as a dried dispersion coating of a low-voltage lithium insertion compound or intercalation material, e.g., a powdered carbon, in a copolymer matrix was similarly overlaid upon the separator membrane layer, and a copper collector foil or grid was laid upon the negative electrode layer to complete a cell assembly. This assembly was then heated under pressure, preferably in staged operations, to effect heat-fused bonding between the plasticized copolymer matrix components and to the collector grids to thereby achieve lamination of the cell elements into a unitary flexible battery cell structure.

The resulting laminated battery structure, which comprised a significant measure of homogeneously distributed organic plasticizer, particularly in the separator membrane stratum, was devoid of hygroscopic electrolye salt and, as a result, could be stored at ambient conditions, either before or after being shaped or further processed, without concern for electrolyte deterioration due to reaction with atmospheric moisture. When it was desired to activate a battery in the final stage of manufacture, the laminate cell structure was immersed in or otherwise contacted with an electrolyte salt solution which imbibed into the copolymer matrix to provide substantially the same ionic conductivity enhancement as achieved by a preformed hybrid separator/electrolyte film containing such an electrolyte salt solution.

In order to facilitate the absorption of electrolyte solution during activation, it is generally preferred that a substantial portion of the plasticizer be previously removed from the copolymer matrix. This may readily be accomplished at any time following the laminating operation by immersion of the cell laminate in a copolymer-inert solvent, such as diethyl ether, methanol, or hexane, which selectively extracts the plasticizer without significantly affecting the copolymer matrix of the cell element strata. The extracting solvent may then simply be evaporated to yield a dry, inactive battery cell which will readily absorb an effective amount of electrolyte solution that essentially replaces the extracted plasticizer.

The preferred poly(vinylidene fluoride-co-hexafluoropropylene)(VdF:HFP) copolymer materials described in the incorporated disclosures were selected from numerous candidate polymers on the basis of their unique balance of strength, flexibility, crystallinity, and solubility which were essential for the preparation of practical electrolytic cells. Such a combination of properties was determined to be lacking in most other polymeric materials, even such closely related terpolymers and copolymers as poly(vinylidene fluoride-cotetrafluoroethylene). It was thus surprising, indeed, when, in the instant invention, it was discovered that electrolytic cells and resulting rechargeable lithium-ion batteries of exceptional quality could be fabricated with the present poly(vinylidene fluoride-co-chlorotrifluoroethylene) (VdF:CTFE) copolymers.

SUMMARY OF THE INVENTION

The VdF:CTFE copolymers which have now been found to be particularly useful in the preparation of lithium-ion batteries are suspension-polymerized materials which are commercially available, for example, from Solvay Polymers as SOLEF 3xxxx-series copolymers. Films of these copolymers containing about 8% to 20% chlorotrifluoroethylene and cast from organic solution, e.g., acetone, in compositions comprising about 20% to 60% of a compatible plasticizer, e.g., dibutyl phthalate (DBP), with about 10 to 70%, on a polymer basis, of a finely-divided inorganic filler exhibited highly suitable flexibility, elasticity, and thermal flow properties for processing into battery cell structures as previously disclosed.

Similarly, the films responded favorably to further processing with a selective solvent, such as diethyl ether or methanol, which extracted a substantial portion of the DBP plasticizer without affecting the integrity of the film. Subsequent reswelling of the films with an organic lithium salt electrolyte solution, e.g., 1M $LiPF_6$ in a mixture of ethylene carbonate (EC): dimethylcarbonate (DMC) (2:1 vol. ratio), resulted in essentially dry hybrid separator/electrolyte membranes exhibiting useful ionic conductivities in the range of about 1.8 to $2.5 \times 10^{-3}$ S/cm.

The copolymer materials were suitable also for use as the polymeric matrix of battery cell electrode compositions comprising transition metal oxide intercalation compounds, such as $Li_xMn_2O_4$, $Li_xCoO_2$, and $Li_xNiO_2$, and complementary lithium intercalating materials, such as carbon, petroleum coke, and graphite. Composite cell structures including such electrode and separator composition elements with accompanying conductive collector elements were readily laminated by heat and pressure to form unitary battery cells in the manner described in the earlier disclosures.

BRIEF DESCRIPTION OF THE DRAWING

The present invention will be described with reference to the accompanying drawing of which.

DESCRIPTION OF THE INVENTION

Figure 1:
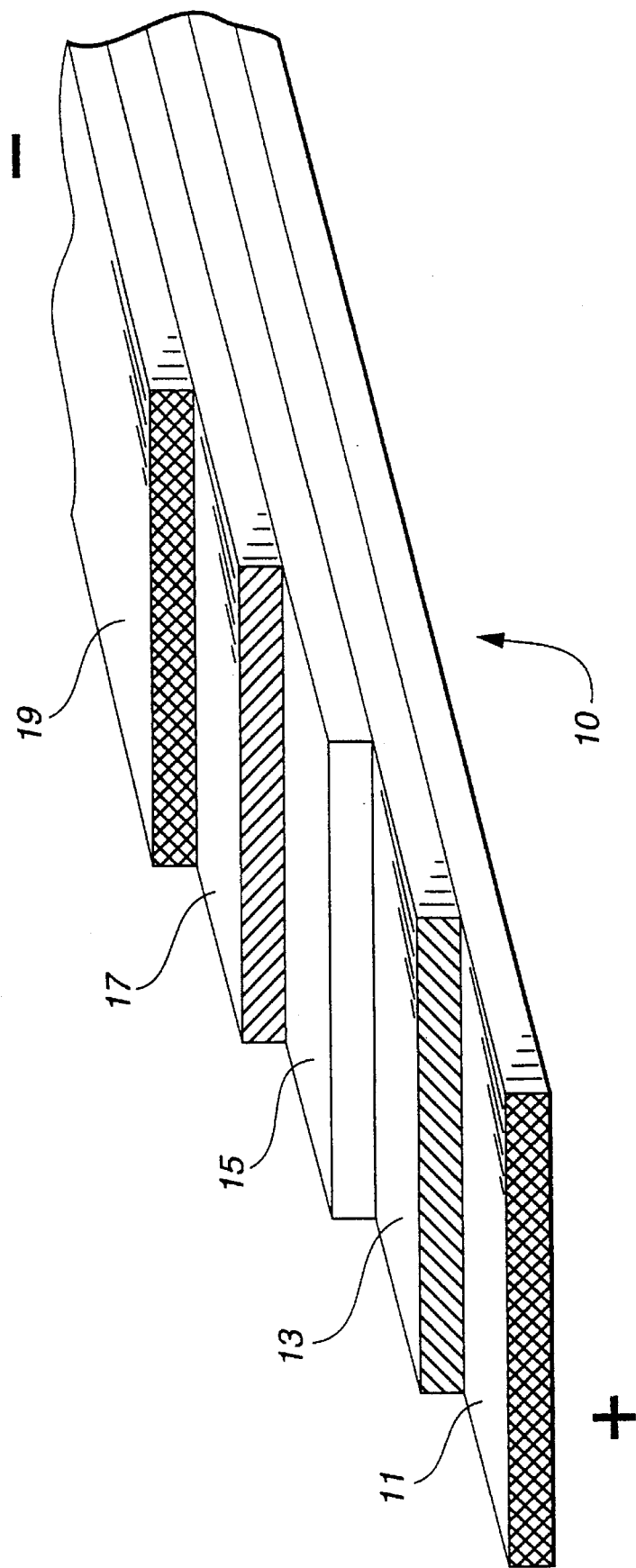
FIG. 1 is a diagrammatic representation of a typical lithium-ion battery cell utilizing polymeric compositions of the present invention.

According to the following examples, lithium-ion rechargeable battery cells were prepared with the PVdF:CTFE copolymers in the manner described in the above-referenced incorporated patent specifications. The basic structure of such a cell 10 is depicted in FIG. 1 and essentially comprises positive and negative electrode layer elements 13, 17 between which is interposed a separator/electrolyte element 15 comprising a polymeric matrix, for example, the present VdF:CTFE copolymer, in which a lithium salt electrolyte solution will ultimately be dispersed. These electrodes respectively comprise a lithiated intercalation compound, e.g., $Li_xMn_2O_4$, and a complementary material capable of reversibly intercalating lithium ions, e.g., carbon in the form of petroleum coke or graphite, each dispersed in a similar polymeric matrix. Electrically-conductive current collectors 11, 19, preferably of aluminum and copper, or nickel, contact respective electrode elements 13, 17 and are bonded, such as by thermal lamination, with the remaining cell elements to form a unitary battery cell. In order to facilitate subsequent processing of the cell, e.g., to incorporate the lithium salt electrolyte, at least one, and preferably both, of the collector elements is permeable to fluids, such as in the form of a perforate expanded metal grid. Electrically-conductive strips or similar conductors (not shown) attached to collectors 11, 19 provide for utilization of the cell.

EXAMPLE 1

A separator/electrolyte membrane coating composition was prepared by suspending 6 g of an 85:15 vinylidene fluoride (VdF):chlorotrifluoroethylene (CTFE) copolymer of about $60 \times 10^3$ MW (Solvay Polymer - SOLEF 31508) and 4 g of silanized fumed silica in about 40 g of acetone and adding to this mixture about 8 g of dibutyl phthalate (DBP). The completed mixture was warmed to about 50° C. to facilitate dissolution of the copolymer and was homogenized in a laboratory ball mill for about 6 hr. A portion of the resulting slurry was coated on a silanized polyethylene terephthalate (PET) substrate with a doctor blade device gapped at about 0.5 mm. The coated film was allowed to dry within the coating enclosure under moderately flowing dry air at room temperature for about 5 min to yield a tough, flexible film which was stripped from the substrate. The film was about 0.1 mm thick and was easily cut into rectangular separator elements which could be stored for weeks at ambient room conditions without significant weight loss. Similar results were obtained with a 90:10 VdF:CTFE copolymer (Solvay Polymer - SOLEF 310035). The silica filler which is incorporated to enhance subsequent electrolyte solution absorption could be varied within the range of about 10 to 70% based on the weight of the copolymer. A fumed alumina filler served similarly well.

EXAMPLE 2

A positive electrode composition was prepared by homogenizing in a lid-covered stainless steel blender for about 10 min at 4000 rpm a warmed (50° C.) mixture of 44 g of $Li_{1+x}Mn_2O_4$, where $0 \leq x \leq 1$ (e.g., $Li_{1.05}Mn_2O_4$ prepared in a manner described in U.S. Pat. No. 5,266,299), 11.8 g of the VdF:CTFE copolymer of example 1,18 g dibutyl phthalate, 4.7 g conductive carbon (Super-P Black, MMM Carbon, Belgium), and about 75 g acetone. The resulting slurry was degassed by briefly applying a reduced pressure to the mixing vessel, and a portion was then coated on the PET substrate with a doctor blade device gapped at about 0.8 mm. The coated layer was allowed to dry within the coating enclosure under moderately flowing dry air at room temperature for about 10 min to yield a tough, flexible film which was stripped from the substrate. The film was about 0.25 mm thick and was easily cut into rectangular electrode elements which could be stored for weeks at ambient room conditions without significant weight loss.

EXAMPLE 3

A negative electrode composition was prepared by homogenizing in a lid-covered stainless steel blender for about 10 min at 4000 rpm a warmed (50° C.) mixture of 21 g of a commercial petroleum coke (MCMB 25-10, Osaka Gas), 6.0 g of the VdF:CTFE copolymer of Example 1, 9.4 g dibutyl phthalate, 1.12 g Super-P conductive carbon, and about 36 g acetone. The resulting slurry was degassed by briefly applying a reduced pressure to the mixing vessel, and a portion was then coated on the PET substrate with a doctor blade device gapped at about 0.5 mm. The coated layer was allowed to dry within the coating enclosure under moderately flowing dry air at room temperature for about 5 min to yield a tough, flexible film which was readily stripped from the substrate. The film was about 0.15 mm thick and was easily cut into rectangular electrode elements which could be stored for weeks at ambient room conditions without significant weight loss.

A battery cell, as depicted in FIG. 1, was prepared by laminating the respective separator and electrode layer materials of Examples 1–3 with expanded metal grid collector elements in the manner described in the previous disclosures. In the laminating operation, the open-mesh collector elements were at least partially embedded in the polymeric compositions of their respective electrodes, thereby ensured effective adherence and electrical contact.

Figure 2:
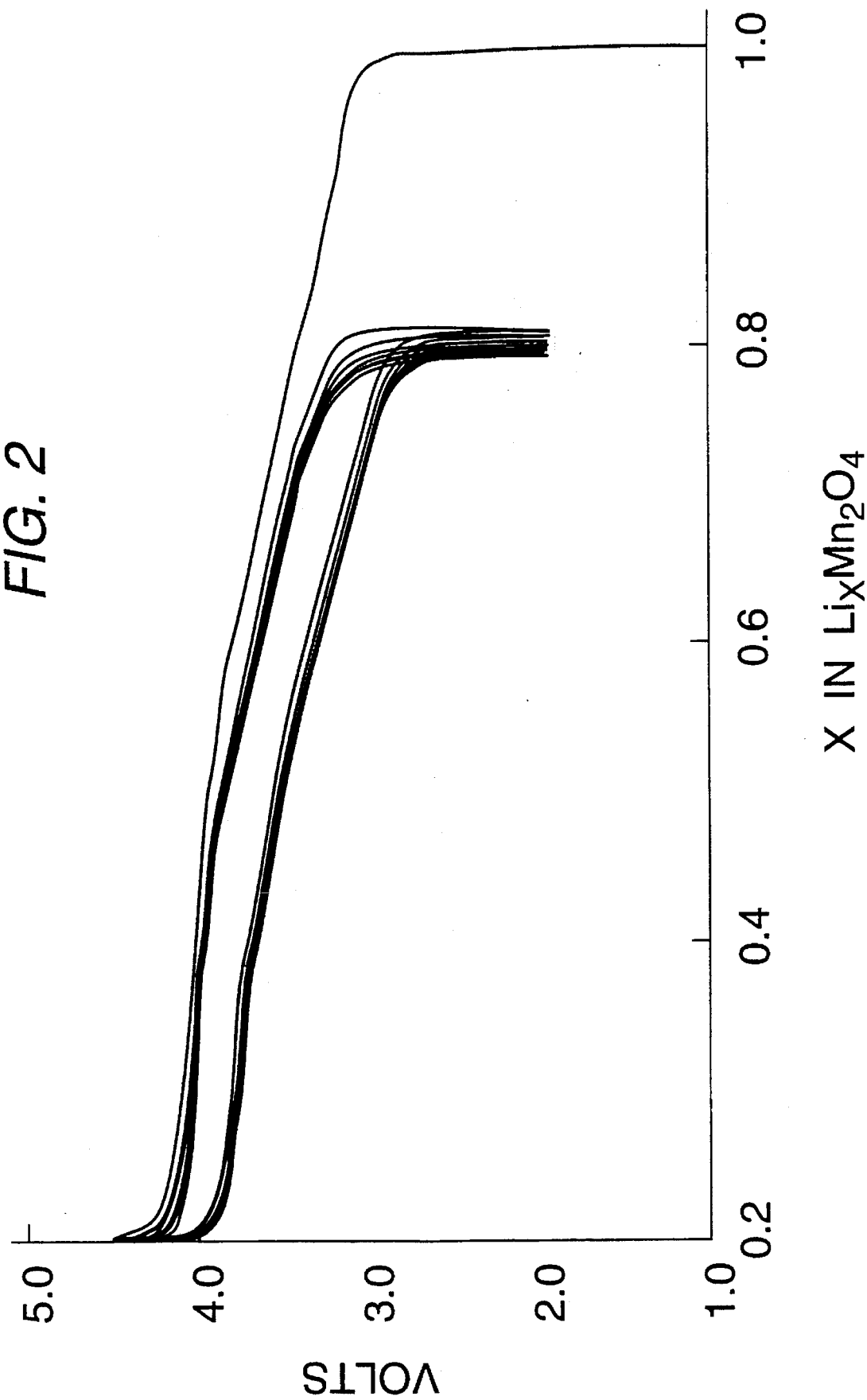
FIG. 2 is a graph tracing the recycling voltage as a function of intercalated lithium for a composite lithium-ion battery cell of FIG. 1.

The laminated battery structure was then extracted of a substantial amount of the DBP plasticizer comprising the polymer matrices of the laminated layers, particularly the separator/electrolyte, by immersion for about 10 minutes in stirred diethyl ether. The extracted battery structure was dried and then activated in preparation for charge/discharge cycle testing by immersion, under a substantially moisture-free atmosphere, in a 1M electrolyte solution of $LiPF_6$ in 50:50 ethylene carbonate (EC):dimethylcarbonate (DMC)

for about 20 min during which the battery imbibed an amount of solution which substantially replaced the extracted plasticizer. The activated battery was then hermetically sealed, but for extending electrical conductors, in a close-fitting envelope of moisture-proof barrier material, such as polyolefin/aluminum foil/ polyester laminate sheeting commercially used for foodstuff and chemical enclosures. The battery was then tested, in the usual manner, over a number of charge/discharge cycles with results as plotted in the graph of FIG. 2 attesting to the efficacy and stability of the battery components.

What is claimed is:

1. A rechargeable battery structure comprising a positive electrode element, a negative electrode element, and a separator element disposed therebetween characterized in that
 a) each of said elements comprises a flexible, self-supporting, polymeric matrix film composition;
 b) each said element is bonded to contiguous elements at its respective interfaces to form a unitary flexible laminate structure; and
 c) said separator element composition comprises a copolymer of vinylidene fluoride with about 8 to 20% by weight chlorotrifluoroethylene and has homogeneously distributed therein about 20 to 60% by weight of a compatible organic plasticizer for said copolymer.

2. A rechargeable battery structure according to claim 1 wherein said separator element composition comprises about 10 to 70% by weight based on said copolymer of an inorganic filler selected from fumed alumina and silanized fumed silica.

3. A rechargeable battery structure according to claim 1 wherein said positive electrode element composition comprises a lithium intercalation compound homogeneously distributed in a matrix of said separator element composition.

4. A rechargeable battery structure according to claim 3 wherein said lithium compound has a nominal formula selected from $LiMn_2O_4$, $LiCoO_2$, and $LiNiO_2$.

5. A rechargeable battery structure according to claim 4 wherein said lithium compound has the formula $Li_{1+x}Mn_2O_4$ where $0 \leq x \leq 1$.

6. A rechargeable battery structure according to claim 3 wherein said negative electrode element composition comprises a substance selected from the group consisting of lithium intercalating carbon materials and low-voltage lithium insertion compounds homogeneously distributed in a matrix of said separator element copolymer.

7. A rechargeable battery structure according to claim 6 wherein said negative electrode element composition substance is selected from the group consisting of petroleum coke and graphite.

8. A rechargeable battery structure comprising a laminate structure according to claim 1 from which at least a portion of said plasticizer has been extracted.

9. A rechargeable battery structure comprising a laminate structure according to claim 1 in which at least a portion of said plasticizer has been replaced with a lithium battery electrolyte solution.

10. A rechargeable battery structure comprising a positive current collector element, a positive electrode element, a separator element, a negative electrode element, and a negative current collector element characterized in that
 a) each of said collector elements comprises a flexible electrically-conductive foil,
 b) each of the others of said elements comprises a flexible, self-supporting, polymeric matrix film composition;
 c) each said element is bonded to contiguous elements at its respective interfaces to form a unitary flexible laminate structure; and
 d) said separator element composition comprises a copolymer of vinylidene fluoride with about 8 to 20% by weight chlorotrifluoroethylene and has homogeneously distributed therein about 20 to 60% by weight of a compatible organic plasticizer for said copolymer.

11. A rechargeable battery structure according to claim 10 wherein said copolymer comprises about 10 to 15% by weight chlorotrifluoroethylene.

12. A rechargeable battery structure according to claim 10 wherein at least one of said collector element foils comprises an open-mesh grid.

13. A rechargeable battery structure according to claim 12 wherein said at least one collector element is at least partially embedded in the electrode element interfacing therewith.

* * * * *

UNITED STATES PATENT AND TRADEMARK OFFICE
CERTIFICATE OF CORRECTION

PATENT NO. : 5,571,634  
DATED : November 5, 1996  
INVENTOR(S) : Gozdz et al.

Page 1 of 1

It is certified that error appears in the above-identified patent and that said Letters Patent is hereby corrected as shown below:

<u>Title page,</u>  
Related U.S. Application Data, after "Pat. No. 5,418,091" please insert -- , which in turn was itself a continuation-in-part of U.S. Patent Application S.N. 08/026,904, filed 5 March 1993, Pat. No. 5,296,318 --.

Signed and Sealed this

Twenty-seventh Day of November, 2001

Attest:

*Nicholas P. Godici*

NICHOLAS P. GODICI  
*Acting Director of the United States Patent and Trademark Office*

*Attesting Officer*